Figures 8, 9:
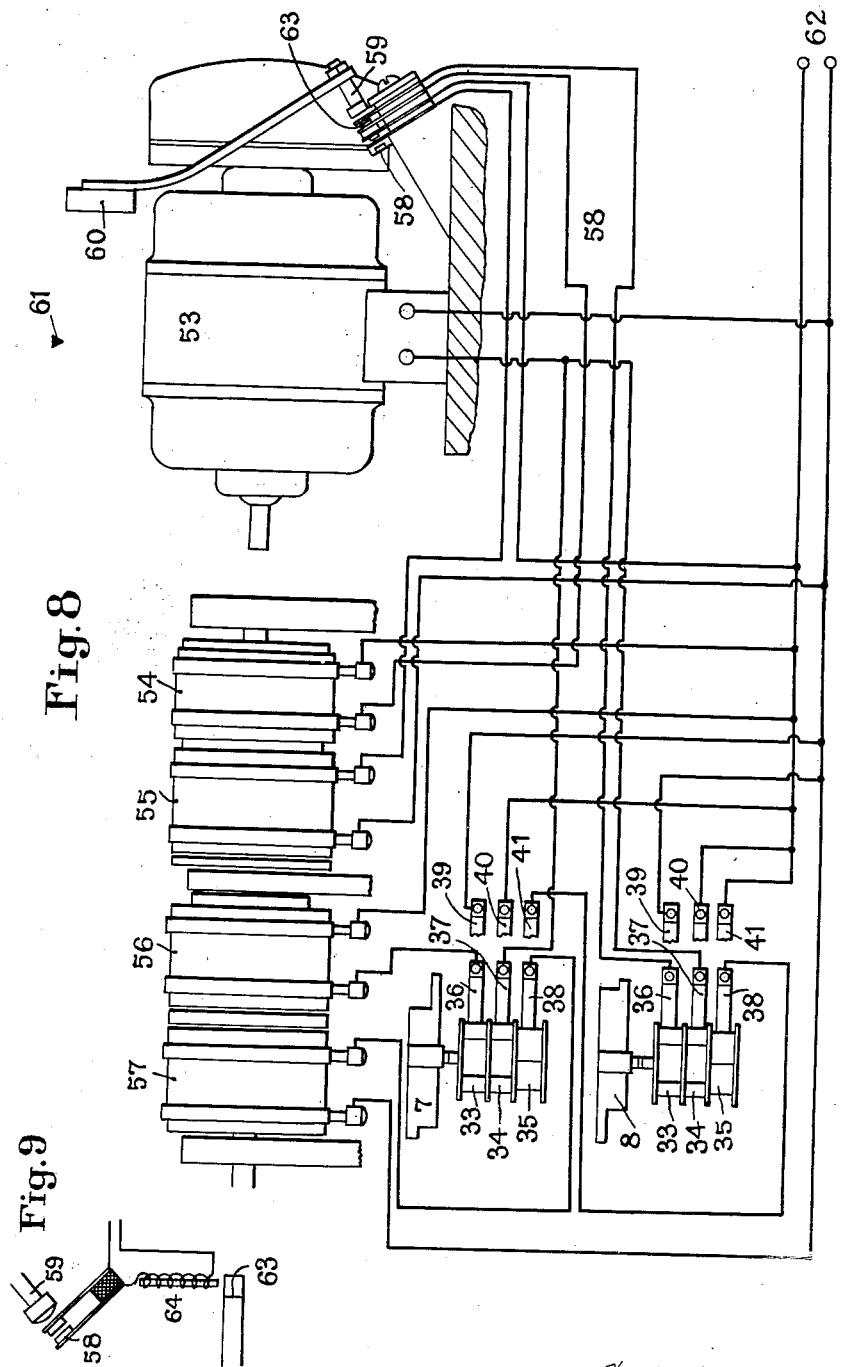

June 4, 1935.  C. CADIET  2,004,034
POISE DEVICE
Filed June 8, 1934  3 Sheets-Sheet 1
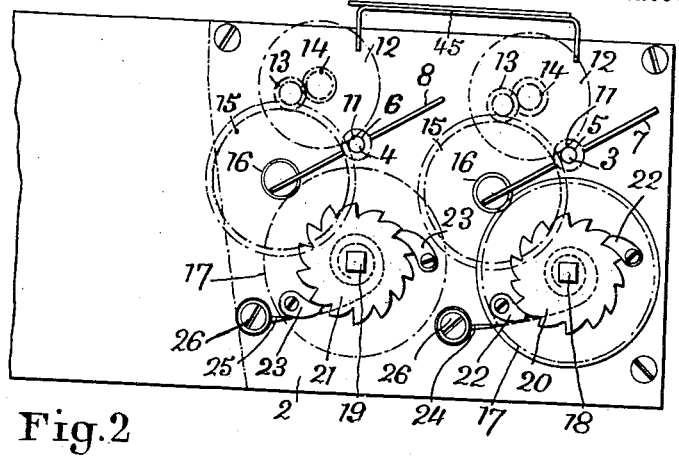

June 4, 1935.  C. CADIET  2,004,034
POISE DEVICE
Filed June 8, 1934   3 Sheets-Sheet 2
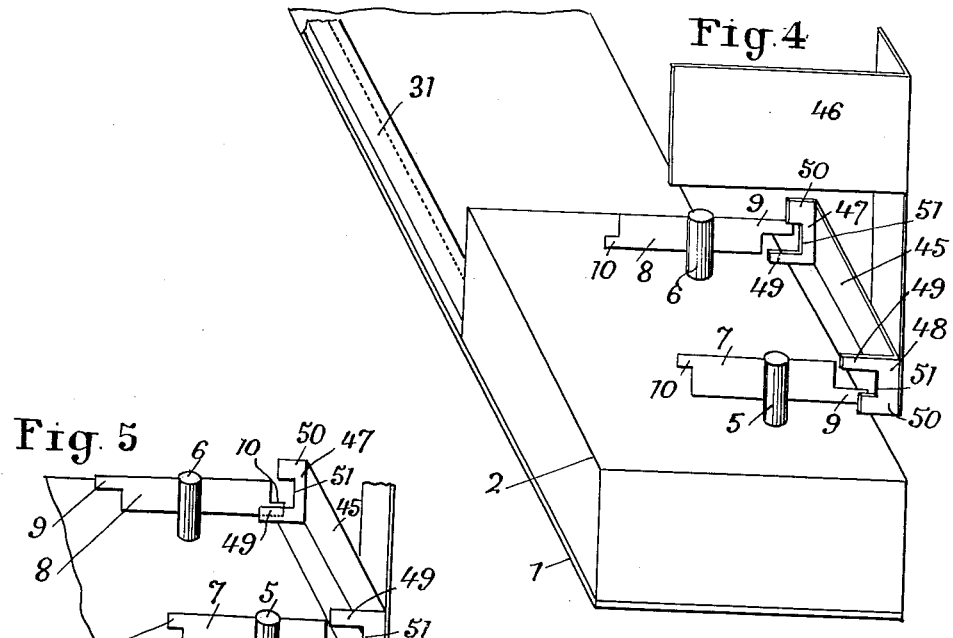
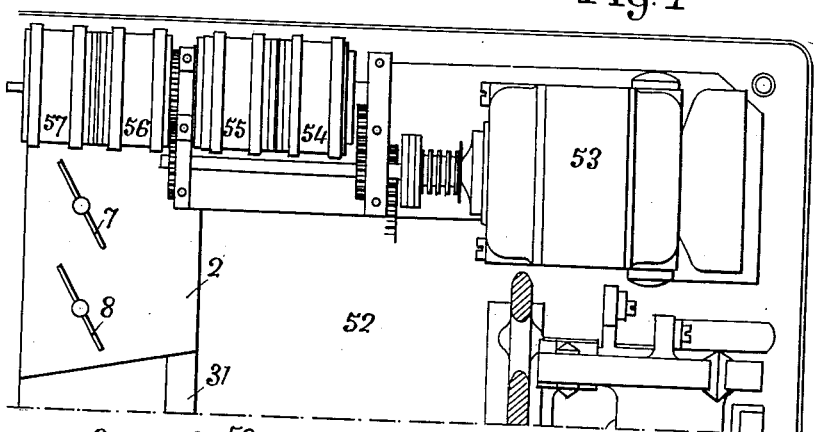
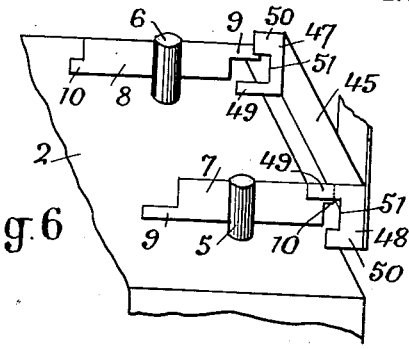
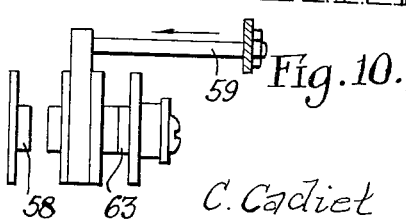
C. Cadiet
INVENTOR
By: Marks & Clark
ATTYS.

June 4, 1935.  C. CADIET  2,004,034

POISE DEVICE

Filed June 8, 1934  3 Sheets-Sheet 3

C. Cadiet
INVENTOR

By: Marks & Clark

Patented June 4, 1935

2,004,034

UNITED STATES PATENT OFFICE 2,004,034

POISE DEVICE

Charles Cadiet, Paris, France, assignor to the firm Société Anonyme des Etablissements Charles Testut, Paris, France Application June 8, 1934, Serial No. 729,709
In France June 3, 1933

5 Claims. (Cl. 265—70)

My invention relates to an automatic poise device for weighing apparatus.

The devices which are generally used for weighing apparatus are subject to some drawbacks. The electrically driven apparatus requires contacts which, for good operation, necessitate a rather high mechanical pressure which it is not possible to obtain owing to the sensibility which the apparatus has to be provided with.

The mechanical devices very often produce considerable friction which reduces the sensibility of the weighing apparatus. On the other hand, the exclusively electrical devices are also subject to drawbacks, owing to the variations of voltage of the feeding electric current, so that such devices very seldom have a constant action and must be submitted to frequent regulation.

The device according to my invention which remedies the above drawbacks comprises in combination with the scale beam a releasing device controlled by said beam and operating by means of covenient cams the closing and the breaking of electric contact pieces located in the circuits which feed the driving device of the operating mechanism of the beam, in order to cause, by the displacements of the beam, the bringing in convenient position of the cams which control the driving device for obtaining the balancing of the beam.

In the accompanying drawings which show by way of example a constructional form of a preferred embodiment of the device according to my invention when applied to an automatic weighing apparatus with movable poise, and the mechanism of which is acted upon by an electric motor:—

Fig. 1 is a sectional view of the mechanism along the line I—I of Fig. 3,

Fig. 2 shows by a section along the line II—II of Fig. 3 cams and contact pieces acted upon by said cams, Fig. 3 is a side view corresponding to Figs. 1 and 2, Fig. 4 is a perspective view of the mechanism, Figs. 5 and 6 are views similar to Fig. 4 corresponding to the phases of operation, Fig. 7 diagrammatically shows the arrangement of my invention on an automatic weighing apparatus, Fig. 8 is a diagram showing the several electric connections, Fig. 9 is a modification of a part of Fig. 8, Fig. 10 is a side view of the contacts operated by the beam.

According to my invention, the driving or controlling device comprises a release mechanism provided with two side plates 1 and 2 with spindles 3 and 4 located between said plates. Secured on the end of each of said spindles by means of a head 5, 6, is a blade or vane 7, 8. Said vanes, more particularly shown in Figs. 8 and 4, are formed at their ends, as shown in Fig. 4, in the shape of beaks 9 and 10, the beak 9 being longer than beak 10 as shown in the drawings. The position of said beaks is such that for instance as to vane 7 the longer beak 9 lies in its inner position i. e. closer to plate 2, and beak 10 in its external position, whilst then, as to vane 8, the longer beak 9 is in its external position, and the short beak 10 in its internal position. Both vanes are thus inverted relatively to each other.

Spindles 3, 4, are each provided with a pinion 11 which through convenient wheels and pinions 12, 13, 14, 15, 16, 17, receives a movement from a shaft 18 or 19. Each shaft 18 and 19 is provided at one end with a ratchet 20, 21, the pawls of which 22, 23 are each solid with one wheel 17, which wheels 17 are loosely mounted on shafts 18, 19. Secured on said shafts 18, 19, are the ends of springs 24, 25 which are carried on braces 26 which keep the side plates at a convenient distance apart. Located on the other end of each shaft 18, 19, is a crank 27, 28, keyed on said shaft and said cranks are in contact with knobs 29, 30 located on an actuating rod 31 guided by means of a finger 32 (Fig. 2.) It is thus seen that when said rod 31 receives a movement from a moving part connected to the beam in the direction of the arrow in Fig. 2, knobs 29, 30 cause cranks 27, 28 and spindles 18, 19 to rotate, thus stretching springs 24, 25. When the rod 31 is moved in the opposite direction, springs 24, 25 will cause the shafts to rotate in a reverse direction, and the ratchets 20, 21, together with pawls 22, 23, will cause each wheel 17 to rotate, said wheels then transmitting their movement to pinions 11 and thence to spindles 3 and 4.

Located on spindles 3 and 4 (Figs. 2 and 3) and connected with said spindles so as to rotate therewith, are cams 33, 34, 35, constituted preferably of an insulating substance such as fiber, said cams being of a conveniently determined shape. In the vicinity of said cams are provided movable fingers 36, 37, 38, which are to contact with stationary fingers 39, 40, 41. Movable fingers 36, 37, 38 are connected with terminals such as 42, and the stationary fingers are connected with other terminals such as 43. It is thus seen that for a given position of each vane 7, 8, and according to the shape and arrangement of cams such as 33, 34, 35, one or several contact pieces will be connected by the corresponding finger 36, 37, and 38 acting upon stationary finger 39, 40 or 41.

As shown in Fig. 4 which shows the mechanism in a position for its application to the control of automatic poising device, the lower side plate 1 is conveniently secured upon the stand of the apparatus. Located in front of vanes 7, 8, are the ends of a releasing cross piece 45 connected with a plate 46 which itself is either directly or indirectly connected with the beam of the weighing apparatus.

Both ends 47, 48 of the releasing cross piece 45 are similarly shaped as vanes 7, 8, one end of same being provided with a long thin beak 49 and the other end with a short wide pad 50, said parts being separated by a gap 51, and the arrangement of beaks and pads being reversed one end with respect to the arrangement at the other end.

As clearly seen in Figs. 4, 5 and 6, the operation is then as follows:—

For the position of rest of the weighing apparatus (Fig. 4) both vanes 7, 8, are stationary and maintained at rest, one of their beaks 9 or 10 being in contact with either the pad or the beak of each of the ends of the cross bar 45. The weighing device being thrown out of balance (Fig. 4) either by loading (Fig. 5) the plate of said balance or by removing a load (for instance Fig. 6), the beam swings bringing with it, through plate 46, the releasing cross piece 45. Because of this movement one or the other of vanes 7, 8, has its beak out of contact with one end 47 or 48 of plate 45, and the rotation of the considered vane 7, 8, causes through cams 33, 34, 35 the closing of electric circuits thus feeding with electric current the motor or motors which operate the weighing mechanism.

Thus for the position of balance of the beam it is possible to arrange parts so that the driving motor or motors are stopped, and the brakes being applied lock the mechanism.

Thus for instance in the case of loading of the plate, in weighing a load, thus increasing the load carried by the plate (Fig. 5) the releasing cross piece 45 receives from the beam a slight upward displacement. The vane 7 is not affected by such displacement, pad 50 of end 48 of cross piece 45 remaining in fact before the beak 9 of said vane. On the contrary, the pad 50 is removed from the beak 9 of vane 8 thus allowing said vane to rotate under the action of the corresponding driving spring 25. Such rotation is limited to half a turn since beak 49 has come into the path of beak 10 of the vane thus locking same.

With said rotation of said vane corresponds an equivalent rotation of cams 33, 34, 35, which secure the opening or the closing of contact between parts 36, 37, 38 and 39, 40, and 41, so that when for instance the brake which locked the mechanism is unlocked, the electric motor, being fed with electric current, actuates the mechanism of the balancing device of the weighing machine in order to restore said machine to a balanced position.

When said balance is nearly obtained, the beam coming back into its balanced position, carries with it the cross piece 45 so that beak 49 moves away from beak 10 and disengages same, the vane 8 rotates half a turn more its movement being stopped by the contact of beak 9 with pad 50 of end 47 of cross bar 45.

The device is locked anew as in the case of Fig. 4. If, on the contrary, the weighing is effected by unloading the plate (Fig. 6) the vane 8 is not brought into action the pad 50 being still before the beak 9 of said vane. It is then vane 7 which rotates half a turn owing to the displacement of pad 50 in front of beak 9, the vane being locked anew by the contact of beak 10 with beak 49. The contacts between the movable fingers and stationary fingers actuated by the cams of shaft 3 of vane 7, are then conveniently either broken or closed in order to allow the balancing mechanism of the weighing device to be brought into action. When the device is brought back to a balanced position the cross bar 45 is displaced once more in order to allow vane 7 to come back to its original position in the same manner as it has been said hereabove in the preceding example of weighing through loading.

Fig. 7 diagrammatically shows in plan view the arrangement of the device on a weighing machine, said device being secured upon the stand 52 of the weighing machine, and the terminals of the device being conveniently connected with the terminals of motor 53 for instance, and with the terminals of the clutch device and brake device 54, 55, 56, 57.

Fig. 8 diagrammatically shows the connections: the source 62 of electric current is connected on the one hand for instance with parts 38 and 41 actuated by cam 35 which is connected with vane 8, said circuit passing moreover through parts 38 and 41 controlled by the cam 35 of vane 7: the contact pieces which have been brought into contact by said parts are then in series and the circuit feeds the electromagnetic clutch 57 which is used for instance for braking the mechanism.

It is thus seen that it is sufficient that one of the contacts should be broken for causing the brake to be loosened. Another circuit going out of said source passes through parts 37, 40 actuated by the cam 34 of vane 8, feeds the motor 53 which actuates the poising mechanism while another circuit passing through parts 37, 40 actuated by the cam 34 of vane 7 feeds motor 53, said both circuits thus feeding the motor for each of the directions of rotation of the mechanism.

A circuit passes through parts 36, 39, actuated by the cam 33 of vane 8 and feeds the electromagnetic clutch 54 which is used for the operation at low speed of the mechanism in the so-called forward direction.

Parts 36 and 39 which are controlled by cam 33 of vane 7 are inserted in a circuit which feeds the electromagnetic clutch 56 used for instance for the reverse operation of the mechanism. Said circuit is controlled on another hand by a contact piece 63 combined with the contact piece 58 operated by a pad 59 which is connected at 60 with the beam. The pivoting axis of the beam is shown at 61.

Said contact pieces are such that when one of the contacts for instance 63, is closed, the other one is broken and vice-versa as shown in Fig. 10. The circuit which passes through contact piece 58 feeds the electromagnetic clutch 55 which controls the operation of the mechanism at high speed.

The operation is as follows:—

When a load is placed upon the plate of the weighing apparatus not shown, the beam swings round its axis 61, the pad 59 depresses contact pieces 63 and 58 and closes the latter and breaks the first one, so that the clutch 55 is fed. At the same time the vane 8 (Fig. 5) rotates so that brake 57 is loosened, the motor 53 is fed by contact pieces 37, 40 whilst the mechanism is brought in operation at high speed. When the beam starts to come back to its balanced position, contact 58 is broken, contact 63 is closed, the clutch 55 is no longer energized, but the clutch 54 of low speed operation is energized through contact pieces 36, 39.

The modification of Fig. 9 could be used in which a coil 64 in series with contact piece 68 causes the contact 63 to be broken when current passes through contact piece 58.

The operation is going on at low speed. When the beam arrives back to its balanced position, the vane 8 driven by spring 25 which is kept under tension comes back to its original position being released from cross-piece 45, the motor stops and the brake is locked.

For the reverse operation, that is to say, when the load is lightened the vane 7 is rotated. Owing to the movement of said vane 7 the motor is started, the brake is disengaged and disconnecting device 56 is energized. By means of this connecting and disconnecting device means for reversing the direction of rotation (such as a toothed gearing) is thrown into engagement in the mechanism of the weighing apparatus.

The device requires only a very little effort for its starting. The only resistance to be overcome is the friction swinging of the beam, between the beak of each of the vanes in contact with the beak of the pad of each of ends 47, 48, of the releasing cross piece 45. Said friction may be reduced to a well-known value as small as desired for it is proportional to the difference between the driving action of each spring 24, 25 and the braking action of the movable blades 36, 37, 38 upon cams 33, 34, 35. It is possible by conveniently designing said parts to reduce the effort of friction of vane beaks upon their abutments to a given value as small as desired in proportion with the condition required for the operation of the weighing device.

The driving action of each spring 24 or 25 may also be determined and maintained between equally determined limits. Bar 31 being in fact in a position to be operated at every operation of the weighing device, both springs are permanently under tension. On the other hand, the winding up of springs at every movement of bar 31 is limited: the amplitude of angular displacement of cranks 27, 28, is limited which consequently limits the elementary rotation of each shaft 18, 19, so that by a convenient arrangement of ratchets 20, 21 and of their pawls 22, 23, the winding up of each spring may be limited to a value corresponding to a rotation of one tooth or two teeth of the ratchet. It is thus possible to provide the springs with a well determined original tension, which tension may afterwards be made as low as desired but is always a known quantity. Vanes such as 7 and 8 could be located upon their spindles in any manner desired, said vanes being also in a position to be provided with more than two active ends thus allowing the operation to be divided in as many phases as desired.

What I claim is:—

1. In a poise device having a beam and operated by electric circuits to bring the beam into its balanced position, means for opening and for closing said circuits comprising a release member operated by the unbalancing of the beam, cams for controlling said opening and closing means and means controlled by said release member for positioning said cams.

2. The device according to claim 1 in which there are two sets of cams and a positioning means controlling each set, the positioning means of one set escaping from the release means when the load on the beam is increased and the positioning means of the other set escaping from the releasing means when the load on the beam is decreased.

3. In a poise device having a beam and operated by electric circuits to bring the beam into its balanced position, two sets of contacts inserted in said circuits, means controlling said contacts comprising a shaft for each set of contacts, means for putting said shaft under rotative tension, a spindle, gearing connecting said shaft to said spindle for one way movement, cams fixedly mounted on each of said spindles, a vane mounted on each of said spindles to rotate therewith, and a cross-piece extending into the path of rotation of said vanes and movable with the beam to lock or to release said vanes.

4. The device as claimed in claim 3 wherein the vanes are similar to each other and formed with a longitudinal beak on one edge of one end and a shorter longitudinal beak on the opposite edge of the other end, and are mounted relatively reversely and the releasing member has flanged extensions with fingers corresponding to the edge extensions.

5. The device as claimed in claim 1 in which there is an additional set of contacts in the circuits and means for operating said additional set of contacts directly from the beam.

CHARLES CADIET.